(12) United States Patent
Leibovich (10) Patent No.: US 9,692,475 B2
(45) Date of Patent: Jun. 27, 2017

(54) ATTACHMENT FOR AN ELECTRONIC COMMUNICATIONS DEVICE

(71) Applicant: CLASSIC PROMOTIONS PTY LTD., Victoria (AU)

(72) Inventor: Aaron Leibovich, Victoria (AU)

(73) Assignee: CLASSIC PROMOTIONS PTY LTD., Clayton, Victoria (AU)

( * ) Notice: Subject to any disclaimer, the term of this patent is extended or adjusted under 35 U.S.C. 154(b) by 47 days.

(21) Appl. No.: 14/743,157

(22) Filed: Jun. 18, 2015

(65) Prior Publication Data

US 2015/0358443 A1    Dec. 10, 2015

Related U.S. Application Data

(63) Continuation-in-part of application No. 14/490,975, filed on Sep. 19, 2014, now abandoned, and a
(Continued)

(30) Foreign Application Priority Data

Jul. 7, 2011    (AU) ................................ 2011203352
Jul. 4, 2014    (AU) ................................ 2014902583

(51) Int. Cl.
*H01Q 1/24*    (2006.01)
*H04B 1/3888*    (2015.01)
(Continued)

(52) U.S. Cl.
CPC ......... *H04B 1/3888* (2013.01); *H04B 1/3838* (2013.01); *H04M 1/0279* (2013.01); *Y10T 29/49131* (2015.01)

(58) Field of Classification Search
CPC ................ H04B 1/3888; H04B 1/3838; Y10T 29/49131; H04M 1/0279
(Continued)

(56) References Cited

U.S. PATENT DOCUMENTS 6,897,826 B1 *    5/2005    Kunz ....................... H01Q 1/52
                                                        343/702
7,525,491 B2    4/2009    Hu et al.
(Continued)

FOREIGN PATENT DOCUMENTS

AU        2011/203352 B1    6/2012
CA        2 269 559 A1    8/1999
(Continued)

OTHER PUBLICATIONS

Feb. 20, 2015 Search Report issued in European Patent Application No. 12807911.8.
(Continued)

*Primary Examiner* — Hoanganh Le
(74) *Attorney, Agent, or Firm* — Oliff PLC; R. Brian Drozd (57) ABSTRACT

An attachment for an electronic communications device including a conducting element that is coated on one side with layers of material and securely affixed to a nonconducting substrate such that the overall dimensions and thickness of the attachment are sufficiently small that it may be attached to a surface of an electronic communications device whilst allowing the use of any protective casing preferred by the user.

10 Claims, 6 Drawing Sheets

Related U.S. Application Data continuation-in-part of application No. 13/581,581, filed as application No. PCT/AU2012/000823 on Jul. 6, 2012, now abandoned.

(51) Int. Cl.
*H04B 1/3827* (2015.01)
*H04M 1/02* (2006.01)

(58) Field of Classification Search
USPC .................................. 343/702, 841, 873
See application file for complete search history.

(56) References Cited

U.S. PATENT DOCUMENTS

| | | |
|---|---|---|
| 2002/0000940 A1 | 1/2002 | Moren et al. |
| 2002/0075189 A1* | 6/2002 | Carillo, Jr. ............. H01Q 1/245 |
| | | 343/702 |
| 2003/0011530 A1 | 1/2003 | Lin |
| 2005/0090299 A1 | 4/2005 | Tsao et al. |
| 2006/0170599 A1 | 8/2006 | Gilmore et al. |
| 2009/0140936 A1 | 6/2009 | Cho et al. |
| 2009/0273525 A1 | 11/2009 | Qi et al. |
| 2010/0113111 A1* | 5/2010 | Wong .................... H01Q 1/243 |
| | | 455/575.5 |
| 2010/0234081 A1 | 9/2010 | Wong et al. |
| 2011/0316753 A1 | 12/2011 | Wu et al. |
| 2014/0197999 A1* | 7/2014 | Podduturi ............ H01Q 1/2233 |
| | | 343/702 |

FOREIGN PATENT DOCUMENTS

| | | |
|---|---|---|
| EP | 1 426 982 A1 | 6/2004 |
| GB | 2370918 A | 7/2002 |
| WO | 2013/003913 A1 | 1/2013 |

OTHER PUBLICATIONS

"Test Sample: Cellsafe RF reduction Case for iPhone 4;" SAR Test Report M110307; May 15, 2011; XP055169231.

Feb. 20, 2014 Office Action issued in Australian Patent Application No. 2012203939.

Nov. 17, 2011 Office Action issued in Australian Patent Application No. 2011203352.

Pong Research Cell Phone Radiation Case; retreived from the Internet on Nov. 16, 2011; http://web.archive.org/web/20100717025822/http://cellphoneradiationblocker.org/22/pong-re-search-cell-phone-radiation-cover>.

Cellsafe1: "CellSafe TV commercial;" retreived Jun. 14, 2011; http://www.youtube.com/watch?v=pd4UW5_FeHU; XP054975738.

Feb. 5, 2015 Search Report issued in European Patent Application No. 14185568.4.

* cited by examiner

ATTACHMENT FOR AN ELECTRONIC COMMUNICATIONS DEVICE

CROSS-REFERENCE TO RELATED APPLICATIONS

This is a Continuation-in-Part of application Ser. No. 13/581,581 filed Aug. 28, 2012, which in turn is a National Phase of Application No. PCT/AU2012/000823 filed Jul. 6, 2012, which claims the benefit of Australian Application No. 2011203352 filed Jul. 7, 2011. The disclosure of the prior applications is hereby incorporated by reference herein in its entirety.

This is also a Continuation-in-Part of application Ser. No. 14/490,975 filed Sep. 19, 2014, which claims the benefit of Australian Application No. 2014902583 filed Jul. 4, 2014. The disclosure of the prior applications is hereby incorporated by reference herein in its entirety.

FIELD OF THE INVENTION

The present invention relates to an attachment for an electronic communications device. In particular, the invention relates to an attachment including a passive conducting element for electromagnetic coupling with the electronic communications device.

BACKGROUND TO THE INVENTION

Mobile phones, and in particular, smart phones capable of transmitting and receiving both voice and data signals, are being used more often. Consequently, users are spending more time speaking to others using their mobile phones and hence, they are holding the mobile phone in close proximity to their head for increasingly greater cumulative periods of time.

Mobile telephones use electromagnetic radiation to communicate with a base station. The World Health Organisation has classified mobile phone radiation as possibly carcinogenic and recommend that users reduce their exposure to the electromagnetic radiation emitted from mobile phones. Therefore, there is a concern by some users that the radiation from mobile phones may be harmful.

Mobile phone manufacturers and health advocates concerned about the increasing incidence of brain cancers amongst users who regularly use their mobile phone recommend use of a headset arrangement during calls. However, users generally prefer to hold a mobile phone in close proximity to their head when using their mobile phone as it is more convenient.

The need to carry a headset in addition to a mobile phone is also inconvenient and therefore many users tend not to use headset arrangements during telephone calls for this reason. There is also a suggestion that headset arrangements comprised of earphones connected to the mobile phone via a conducting wire in which the earphones are directly inserted into a user's ears present, and potentially increase, the same dangers associated mobile phone radiation. Many users therefore do not accept the use of such headset arrangements to be an acceptable solution to the problem.

Air tube headsets have been proposed as an alternative solution to the use of conventional headset arrangements as a means of enabling a user to avoid holding the mobile phone in close proximity to their head during mobile phone use. Air tube headsets, commonly used as a sound transmitting device for passengers in aeroplanes, are hollow plastic tubing formed into a Y-shaped (or fork) arrangement so that the tubing may be connected to, and extends from, the mobile phone to a user's ears. As hollow air tubing does not contain any wires or conducting material, it is often described as an alternative and safe method of achieving mobile sound transmission and allows the user to hold the phone away from the head during use. However, hollow air tube headsets have a number of disadvantages. Firstly, the need to carry the air tube headset is inconvenient and therefore many users tend not to use air tube headsets for this reason. Secondly, many users report inferior sound transmission and sound quality with the use of such headsets and therefore avoid using them.

Manufacturers of many electronic communications devices include warnings in their product literature in relation to radiation risks. For example, most manufacturers of mobile phones generally include warnings regarding the use of their products in relation to the risk of electromagnetic radiation to the user. In particular, product literature will often include recommendations to users to hold the mobile phone a short distance away from the user's head to reduce the risks associated with exposing the user's head to radiation at the levels in the immediate vicinity of the device. In the case of mobile phones, recommendations in manufacturers' product literature range from 10 mm to 25 mm. Unfortunately, these recommendations are rarely followed by users who generally press the mobile phone against their head when using the phone.

Various devices have been proposed to reduce exposure to potentially harmful radiation from electronic communications devices including mobile phones. Although protective casings including a passive antenna which is intended (when used) to reduce the amount of electromagnetic radiation directed toward the user, it is difficult to persuade a user to replace their existing protective case with a new case comprising a passive antenna for the purpose of reducing exposure to radiation. Generally, users purchase a protective casing at the same time that they purchase their electronic communications device and are reluctant to replace the casing without reason.

As a result, manufacturers of protective casings comprising a passive antenna manufacture a wide range of styles and colours of protective cases to suit a wide range of user preferences. Of course, this requirement significantly increases a manufacturer's inventory, storage and shipping costs and increases the prospects of needing to discard, or substantially reduce the sale price, of stock in instances where the style/colour of the protective casing is not considered attractive to users and excess stock remains.

Conventional protective casings described above also have the associated disadvantage of reducing the signal strength of the mobile phone thereby affecting a user's ability to connect and stay connected to the mobile phone network. Of course, any deterioration of signal strength resulting from the use of a protective casing will cause users to remove and discard the protective casing.

A need therefore exists for an alternative device to reduce the exposure of mobile phone radiation to a user's head during mobile phone use that is safe, convenient, and that does not result in any compromise of the sound quality or signal strength of the mobile phone. Further, there is a need for such a device to be capable of use with existing protective casings such that they can be fitted to mobile phones without requiring the user to discard their existing protective casing.

SUMMARY OF THE INVENTION

According to one aspect, the present invention provides an attachment for an electronic communications device including a conducting element that is coated with one or more layers of material and securely affixed to a non-conducting substrate such that the overall dimensions and thickness of the attachment are sufficiently small that it may be attached to a surface of an electronic communications device whilst allowing the use of any protective casing preferred by the user.

In an embodiment, the non-conducting substrate comprises PTFE (polytetrafluoroethylene) that is 0.2 mm in thickness. The choice of this material is beneficial since it has minimal effect upon the signal transmitted and received by the electronic communications device.

In another embodiment, the conducting element comprises conductive material that is copper having a thickness of 0.1 mm.

In another embodiment, the layers of material that coat the conducting element comprise dielectric materials that are mixed and sprayed in layers onto the conducting element.

In an embodiment, the conducting element is coated on both sides with layers of dielectric materials.

In another aspect, the present invention provides a method of manufacturing an attachment for an electronic communications device including:
forming a conducting element;
coating the conducting element with one or more layers of dielectric materials;
allowing the dielectric materials to dry, and
securely attaching the coated conducting element to a non-conducting substrate.

In yet another aspect, the present invention provides an attachment manufactured in accordance with the method of the present invention.

In an embodiment, the conducting element once coated with dielectric material is subsequently coated with a UV acrylic material including an acrylic resin, a monomer, a photo-initiator, additives and solvents.

The electronic communications device may be any device including a mobile phone or a tablet device such as an iPad manufactured by the Apple Corporation, or any other electronic communications device that may be held in close proximity to a user.

The conducting element is held in sufficiently close proximity to the electronic communications device to become electromagnetically coupled with the electromagnetic field emanating from the device. It is the electromagnetic coupling of the conducting element that enables the conducting element to channel radiation emitting from the device and when appropriately configured in a direction away from the user.

In an embodiment, the dielectric material includes any one or more of $Al_2O_3$, $SiO_2$, $Ag_2O$, $B_2O_3$, $MgO$, $Fe_2O_3$, $Na_2O$, $K_2O$, $CaO$, $P_2O_5$, $Au$, $TiO_2$ and/or $FeO$.

In an embodiment, dielectric materials are mixed together in a liquid form and applied in layers to the conducting element by spraying the liquid in a fine mist onto the conducting element. In one embodiment, the conducting element has layers of dielectric material applied in layers to both sides of the conducting element.

In embodiments, the conducting element includes various shaped segments of conducting material and may include V-shaped segments, chevron-shaped segments, linear segments, rectangular and/or triangular segments or any segments or combinations thereof that enable the conducting element to channel electromagnetic radiation to and from the electronic communications device such that the radiation is ported to and from the electronic communications device through the side of the device to which the attachment is attached and hence, reducing the exposure of the user to electromagnetic radiation emanating from and received by the electronic communications device.

An attachment according to the present invention effectively forms a bi-directional band pass filter which allows only signals with a particular frequency range to pass through the filter. The bi-directionality of the filter allows signals (within the relevant band of frequencies) to pass to and from the electronic communications device.

Careful selection of materials forming the conducting element, the conducting element substrate and coatings for the conducting element enable the attachment to achieve a significant reduction in the Specific Absorption Rate (SAR) of radiation in the direction of the user of the electronic communications device without any significant effect upon the strength of the signal transmitted from, or received by, the electronic communications device.

Further, it has been discovered that upon careful selection of a mixture of dielectric materials combined with a configuration of conducting sub-elements comprising the conducting element, allows the formation of a single attachment that provides an appropriate reduction in SAR across a range of electronic communication devices within a group of these devices. In the instance of the electronic communications device comprising a mobile phone, careful selection of materials and the configuration of the conducting element can enable the manufacture of a single attachment that effectively reduces the SAR across a range of mobile phones with only minimal SAR variation across the mobile phone range.

BRIEF DESCRIPTION OF THE DRAWINGS

To assist in understanding the invention and to enable a skilled person to put the invention into practical effect, embodiments of the invention are described below by way of example with reference to the specific example of the electronic communications device being a mobile phone and with reference to the accompanying drawings, in which.

Those skilled in the art will appreciate that minor deviations from the layout of components as illustrated in the drawings will not detract from the proper functioning of the disclosed embodiments of the present invention.

DETAILED DESCRIPTION OF THE EMBODIMENTS OF THE INVENTION

Elements of the invention are illustrated in concise outline form in the drawings, showing only those specific details that are necessary to the understanding of the embodiments of the present invention, but so as not to clutter the disclosure with excessive detail that will be obvious to skilled readers.

In this patent specification, adjectives such as first and second, left and right, front and back, top and bottom, etc., are used solely to define one component or method step from another component or method step without necessarily requiring a specific relative position or sequence that is described by the adjectives.

Figure 1A:
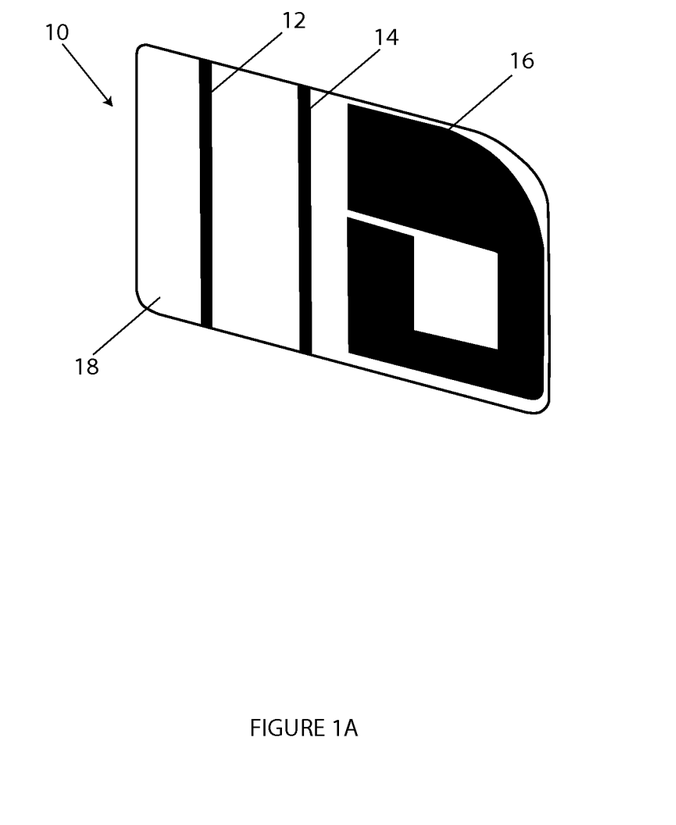
FIG. 1A illustrates a perspective view of a first conducting element.

FIG. 1A illustrates a perspective view of a first conducting element (10). The conducting element (10) includes individual conducting sub elements (12, 14 and 16) that are attached to a flexible printed circuit board material (18).

Figure 1B:
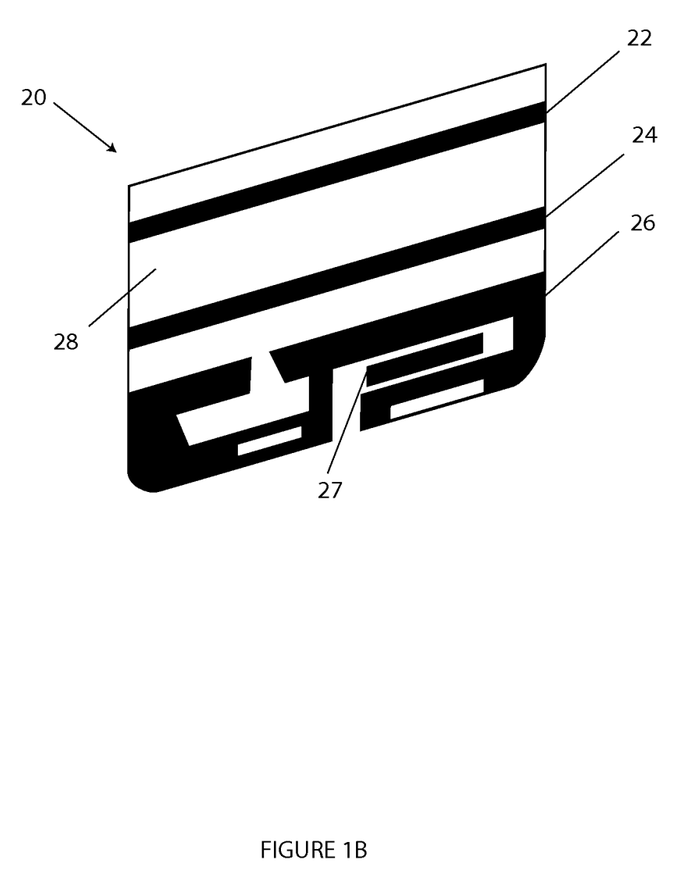
FIG. 1B illustrates a perspective view of a second conducting element.

FIG. 1B illustrates a perspective view of a second conducting element (20). The conducting element (20) includes individual conducting sub elements (22, 24, 26 and 27) that are attached to a flexible printed circuit board material (28).

Figure 1C:
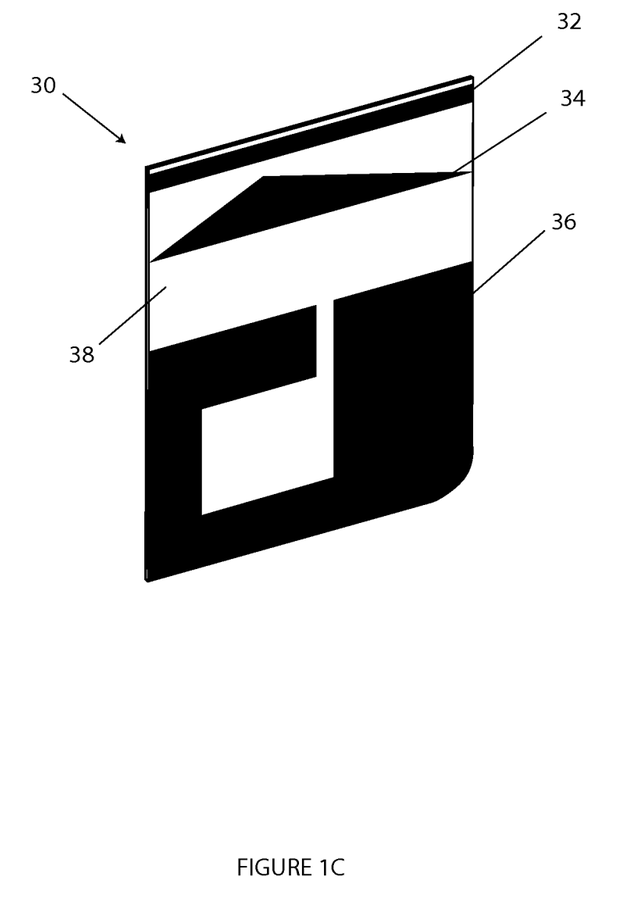
FIG. 1C illustrates a perspective view of the third conducting element.

FIG. 1C illustrates a perspective view of a third conducting element (30). The conducting element (30) includes individual conducting sub elements (32, 34, and 36) that are attached to a flexible printed circuit board material (38).

Figure 2:
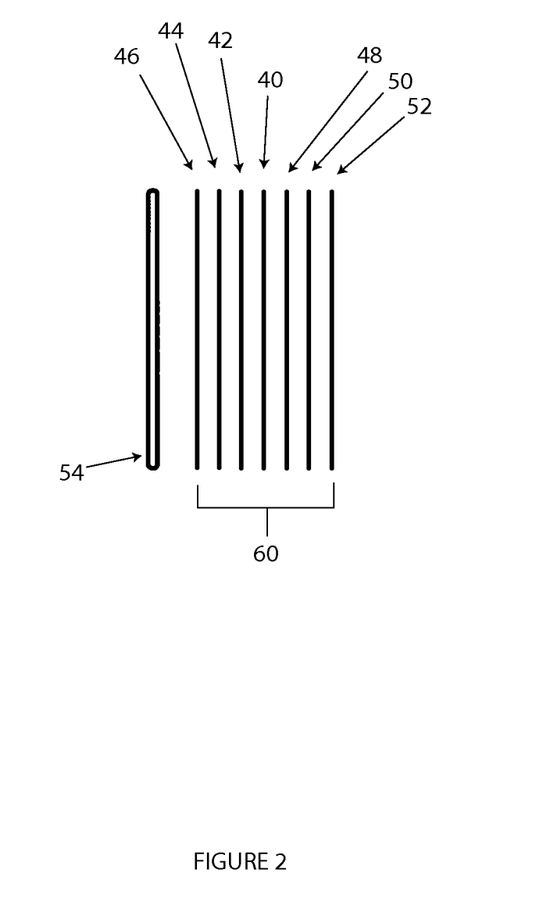
FIG. 2 illustrates an exploded view of a conducting element, various layers of dielectric materials and a non-conducting substrate that together comprise an attachment for an electronic communications device.

FIG. 2 illustrates an exploded end view of a conducting element (40) with various layers of coatings and a non-conductive substrate which together, form an attachment according to an embodiment of the invention.

Referring to the embodiment in FIG. 2, conducting element 40 has three layers of dielectric materials (42, 44, and 46) applied separately in a fine mist to coat the side of the conducting element (40). The opposite side of the conducting element (40) has an additional three layers of dielectric materials (48, 50 and 52) applied separately in a fine mist to coat the opposite side of the conducting element. The individual layers (42, 44, 46, 48, 50 and 52) may include the same or different dielectric material compositions and in one embodiment, layers 42 and 48 comprise the same dielectric material composition, layers 44 and 50 comprise the same dielectric material composition and layers 46 and 52 similarly comprise the same dielectric material composition. It will be appreciated that coating both sides of conducting element (40) with dielectric materials has the associated advantage of further decreasing the SAR of the mobile phone when compared to a conducting element coated with dielectric materials on only one side. Whilst not wishing to be bound by theory, it is believed that this is due to a more focused re-direction of electromagnetic radiation away from a user's head when a conducting element is coated with dielectric material on both sides. That is, whilst the dielectric material coating on one side of the conducting element (40) serves to draw away radiation from a user's head and body, the coating on the opposite side of the conducting element effectively acts as a pump so as to further draw and re-direct radiation from the mobile telephone in a direction outward from the mobile phone.

The composition of the dielectric material according to one embodiment of the invention is shown in Table 1.

TABLE 1

Composition of dielectric material

| Element | $Al_2O_3$ | $SiO_2$ | $Ag_2O$ | MgO | $Fe_2O_3$ | $Na_2O$ |
|---|---|---|---|---|---|---|
| Content % | 29.0-36.0 | 28.0-36.8 | 9.0-13.0 | 3.5-5.7 | 9.0-11.5 | 0.09-1.9 |
| Element | CaO | $P_2O_5$ | $TiO_2$ | FeO | Au | |
| Content % | 0.02-0.15 | 0.1-0.42 | 0.2-0.38 | 0.9-1.85 | 0.008-0.15 | |

Once the individual layers of dielectric materials that coat the conducting element (40) have been allowed to dry, the coated conducting element is securely affixed to the non-conducting substrate (54). In an embodiment, the coated conducting element is securely affixed to the non-conducting substrate (54) by use of a transfer press thus resulting in an attachment (60).

In an embodiment, the attachment (60) is coated with UV acrylic material to protect the attachment (60) from ultra violet radiation.

As will be understood by a person skilled in the relevant field of technology, the attachment (60) may be secured to an external surface of a mobile phone by glue, or by any other means.

In use, the attachment (60) directs electromagnetic radiation away from a user's head by re-directing radiation from the mobile telephone in a direction outward from the mobile phone.

Adding dielectric materials in layered coatings to the conducting element has the effect of filtering electromagnetic radiation emanating from the mobile phone that reside substantially outside the frequency range that is effective for electronic communications of the mobile phone. This can have a substantial effect upon the total radiation direction toward a user of an electronic communications device.

In an alternative embodiment, the one or more layers of the dielectric materials that are applied to the conducting element in a fine mist form have the relative percentages below:

In order to test the efficacy of the attachment for an electronic communications device, the Specific Absorption Rate (SAR), Total Isotropic Sensitivity (TIS) and Total Radiated Power (TRP) were measured under standard test conditions using a simulated user (test dummy) (10 g of simulated tissue) positioned in close proximity to a mobile phone within an anechoic chamber.

The SAR is related to the rate at which energy is absorbed per unit mass of an object exposed to radio frequency radiation and is expressed in units of W/kg. As SAR values are heavily dependent on the size of an average volume or mass, they are usually averaged and reported over a sample volume or mass (typically 1 g or 10 g of tissue). The TIS and TRP, measured in decibels (dB), are measures of antenna efficiency or performance and can be related to the resulting signal strength of the electronic communications device. In general, TIS is the lowest amount of power that can be input to the receiver, such that the receiver can still maintain reliable communication whilst TRP is a measure of the spherical integrated radiated power of the device.

Figure 3A:
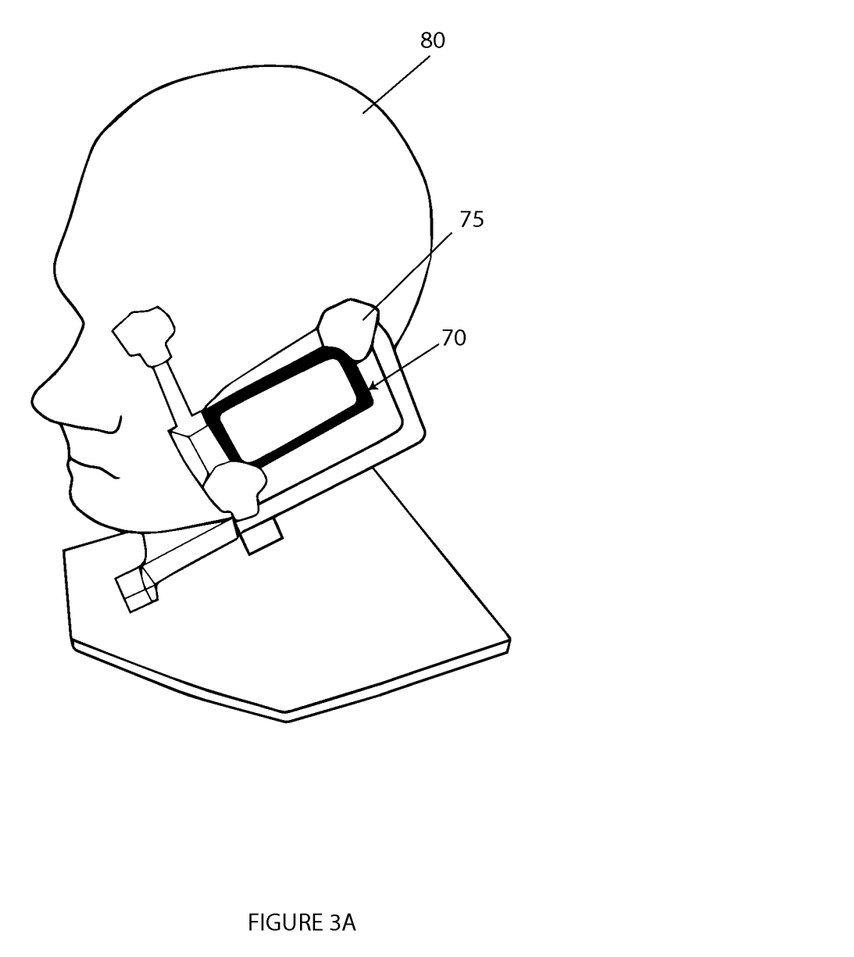
FIGS. 3A and 3B illustrate the positioning of a test mobile phone in relation to a test dummy during experimental testing both before and after adhering an attachment to the test mobile phone device.

FIG. 3A shows the positioning the test mobile phone device (70) without an attachment to measure the electromagnetic radiation emanating from a test mobile phone device (70). The test was conducted in relation to a test dummy head (80) (or "phantom") which included a receiving sensor (not shown) and located inside the dummy head (80). The dummy head (80) and test mobile device (70) were placed within an anechoic chamber where the dummy head (80) (simulating a mobile phone user's head) was exposed to various test radio frequencies whilst in close proximity to the test mobile phone device (70). The test dummy head (70) was composed of a polyurethane shell of thickness 2 mm±0.2 mm filled with a homogenous tissue simulating liquid. The tissue simulating liquid comprised a sugar/salt solution with similar dielectric parameters to human brain tissue in order to simulate the brain tissue of a user's head.

Figure 3B:
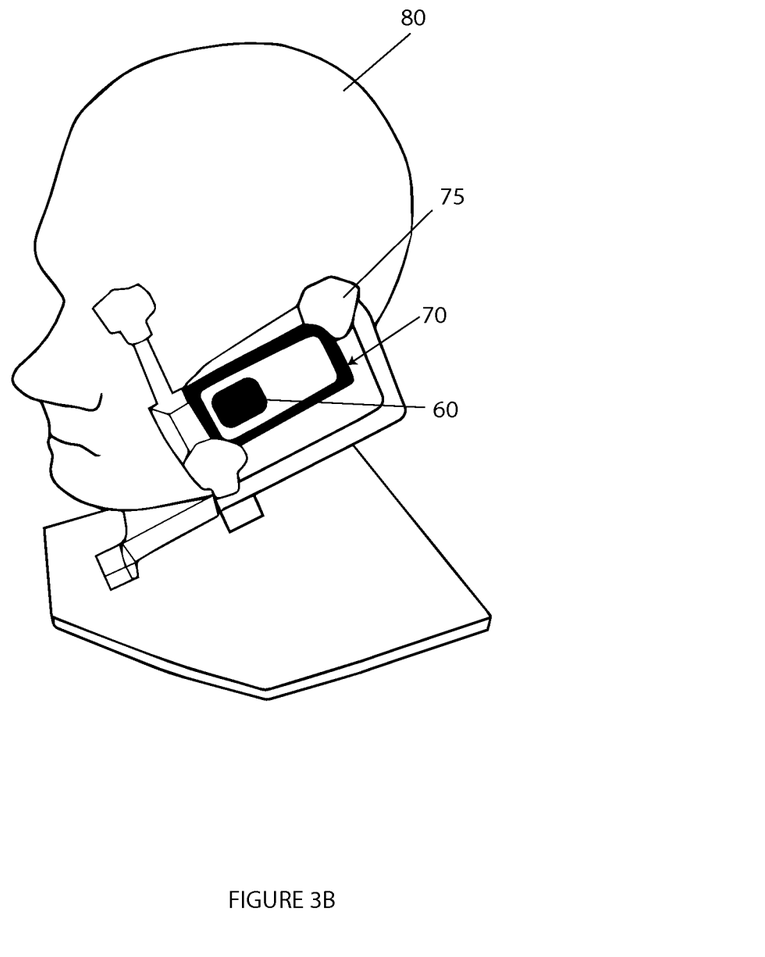

During testing, the test mobile phone device (70) was held in the "cheek" position with plastic holder (75) to the dummy head (80) and the battery of the test mobile phone device (70) was fully charged before each measurement. It was ensured that all testing components were made of non-metal materials in order to avoid distortion of the electromagnetic field that can be observed in the presence of metallic components. The test mobile phone device (70) was set to transmit at its highest output peak power level. As shown in FIG. 3, the test mobile phone device (80) with attachment (60) (not shown) was positioned in the "cheek" position on the left and right hand sides of the simulated user's (phantom) dummy head (70). Testing was performed at an ambient temperature of between 20-25° C. and once a particular test was commenced, the temperature was maintained within ±1° C. as the dielectric parameters of materials can change with temperature. The test was subsequently repeated with an attachment (60) adhered to the test mobile phone device (refer FIG. 3B) and again, measurements were taken at each of the tested frequencies.

An attachment (60) was found to reduce Specific Absorption Rate (SAR) of radiation while a test mobile phone was positioned adjacent a simulated user's head. The test frequencies included 900 MHz, 1,800 MHz, and 2,100 MHz and results are shown in Tables 2 to 5.

Table 2 relates to test results for a mobile phone manufactured by Samsung (model Galaxy S4). An attachment was secured to the face of the mobile telephone on the opposite side of the display screen.

TABLE 2

SAR Test Results for Samsung Galaxy S4 tested on 10 g of simulated tissue

| Phantom configuration | Testing status | Channel | SAR (W/Kg) |
|---|---|---|---|
| LET BAND 3 (1800 MHz) | | | |
| left side of head | Without attachment | 1890 | 0.308 |
| | With attachment | 1890 | 0.104 |
| WCDMA BAND1 (2100 MHz) | | | |
| left side of head | Without attachment | 9750 | 0.219 |
| | With attachment | 9750 | 0.07 |
| WCDMA 900 MHz | | | |
| left side of head | Without attachment | 2787 | 0.207 |
| | With attachment | 2787 | 0.042 |

Table 3 relates to test results for a mobile phone manufactured by Apple (model iPhone 5s). An attachment was secured to the face of the mobile telephone on the opposite side of the display screen.

TABLE 3

SAR Test Results for iPhone 5s tested on 10 g of simulated tissue

| Phantom configurations | Testing status | Channel | SAR (W/Kg) |
|---|---|---|---|
| LET BAND 3 (1800 MHz) | | | |
| left side of head | Without attachment | 1890 | 0.468 |
| | With attachment | 1890 | 0.061 |
| WCDMA BAND1 (2100 MHz) | | | |
| left side of head | Without attachment | 9750 | 0.702 |
| | With attachment | 9750 | 0.084 |
| WCDMA 900 MHz | | | |
| left side of head | Without attachment | 2787 | 0.801 |
| | With attachment | 2787 | 0.27 |

Table 4 relates to test results for a mobile phone manufactured by Blackberry (model 8700). An attachment was secured to the face of the mobile telephone on the opposite side of the display screen.

TABLE 4

SAR Test Results for Blackberry 8700 tested on 10 g of simulated tissue WCDMA BAND1 (2100 MHz)

| Phantom configurations | Testing status | Channel | SAR (W/Kg) |
|---|---|---|---|
| left side of head | Without attachment | 9750 | 0.959 |
| | With attachment | 9750 | 0.104 |

Table 5 relates to test results for a mobile phone manufactured by Nokia (model 630). An attachment was secured to the face of the mobile telephone on the opposite side of the display screen.

TABLE 5

SAR Test Results for Nokia 630 tested on 10 g of simulated tissue WCDMA BAND1 (2100 MHz)

| Phantom configurations | Testing status | Channel | SAR (W/Kg) |
|---|---|---|---|
| left side of head | Without attachment | 9750 | 0.843 |
| | With attachment | 9750 | 0.107 |

The results of Table 2 to Table 5 indicate that, when attachment (60) is secured to the face of a range of different mobile phones (opposite to the side of the phone comprising the display), the SAR value is reduced for all tested frequencies.

In one embodiment, the attachment of the present invention was also tested on an Apple iPad Air where the test device was placed near the body of a test dummy (10 g of simulated tissue) simulating a mobile phone user. Similar to the head testing, the test dummy was filled with tissue simulating liquid to simulate the body of a user. The results of this testing are shown in Table 6.

TABLE 6

SAR Test Results for Apple iPad Air tested on 10 g of simulated tissue

| Phantom configurations | Testing status | iPad air tough case | Channel | SAR (W/Kg) |
|---|---|---|---|---|
| GSM 990 MHz Band | | | | |
| body | Without attachment | N/A | 38 | 0.768 |
| | With attachment | Yes | 38 | 0.121 |
| GSM 1800 MHz Band | | | | |
| body | Without attachment | N/A | 698 | 0.607 |
| | With attachment | Yes | 698 | 0.134 |
| WCDMA 1200 MHz Band | | | | |
| body | Without attachment | N/A | 9750 | 0.745 |
| | With attachment | Yes | 9750 | 0.106 |

The results of Table 6 indicate that when an attachment in accordance with the invention is attached to the face of an iPad device (opposite to the side of the device comprising the display), the SAR value is reduced for all frequencies.

An attachment (60) was also found to not to significantly reduce the mobile phone performance (as measured by the TIS and TRP) when attached to various mobile phones when tested under a range of frequencies. The results are shown in Tables 7 to 11.

Table 7 relates to test results for a mobile phone manufactured by Apple (model iphone 5). An attachment was secured to the face of the mobile telephone on the opposite side of the display screen.

TABLE 7

TRP and TIS Test Results for Apple iphone 5 tested on 10 g of simulated tissue

| Frequency (MHz) | With attachment | Without attachment |
|---|---|---|
| Total Radiated Power (dB) | | |
| 1950 | 16.2684 | 17.0436 |
| 836.6 | 16.3982 | 17.6826 |
| 897.6 | 16.1596 | 16.9561 |
| Total Isotropic Sensitivity (dB) | | |
| 1950 | 106.0852 | 107.1489 |
| 836.6 | 106.3584 | 106.8567 |
| 897.6 | 106.1254 | 106.0235 |

Table 8 relates to test results for a mobile phone manufactured by Apple (model iphone 5s). An attachment was secured to the face of the mobile telephone on the opposite side of the display screen.

TABLE 8

TRP and TIS Test Results for Apple iphone 5s tested on 10 g of simulated tissue

| Frequency (MHz) | With attachment | Without attachment |
|---|---|---|
| Total Radiated Power (dB) | | |
| 1950 | 16.9534 | 17.2349 |
| 836.6 | 16.0269 | 16.5863 |
| 897.6 | 15.9563 | 16.1574 |
| Total Isotropic Sensitivity (dB) | | |
| 1950 | 105.2698 | 106.5324 |
| 836.6 | 105.1586 | 106.0124 |
| 897.6 | 104.3248 | 104.6357 |

Table 9 relates to test results for a mobile phone manufactured by Samsung (model Galaxy S4). An attachment was secured to the face of the mobile telephone on the opposite side of the display screen.

TABLE 9

TRP and TIS Test Results for Samsung Galaxy S4 tested on 10 g of simulate dtissue

| Frequency (MHz) | With attachment | Without attachment |
|---|---|---|
| Total Radiated Power (dB) | | |
| 1950 | 16.3241 | 16.6581 |
| 836.6 | 14.3596 | 15.0145 |
| 897.6 | 14.2158 | 14.9652 |
| Total Isotropic Sensitivity (dB) | | |
| 1950 | 106.0541 | 106.9652 |
| 836.6 | 104.1563 | 105.2365 |
| 897.6 | 103.2486 | 104.7563 |

Table 10 relates to test results for a mobile phone manufactured by Samsung (model Galaxy S5). An attachment was secured to the face of the mobile telephone on the opposite side of the display screen.

TABLE 10

TRP and TIS Test Results for Samsung Galaxy S5 tested on 10 g of simulated tissue

| Frequency (MHz) | With attachment | Without attachment |
|---|---|---|
| Total Radiated Power (dB) | | |
| 1922.4 | 16.5621 | 16.8631 |
| 1950 | 15.6891 | 16.1258 |
| 1977.6 | 14.9653 | 15.0241 |
| Total Isotropic Sensitivity (dB) | | |
| 2112.4 | 107.1473 | 107.3542 |
| 2140 | 105.7532 | 106.1569 |
| 2167.6 | 104.6852 | 105.2461 |

Table 11 relates to test results for a mobile phone manufactured by Blackberry (model 8700). An attachment was secured to the face of the mobile telephone on the opposite side of the display screen.

TABLE 11

TRP and TIS Test Results for Blackberry 8700 tested on 10 g of simulated tissue

| Frequency (MHz) | With attachment | Without attachment |
|---|---|---|
| Total Radiated Power (dB) | | |
| 1710.2 | 15.1574 | 19.8251 |
| 1747.4 | 16.5641 | 20.6586 |
| 1784.8 | 15.7543 | 18.9651 |
| Total Isotropic Sensitivity (dB) | | |
| 1805.2 | 108.381 | 123.514 |
| 1842.4 | 107.525 | 110.128 |
| 1879.8 | 107.146 | 111.682 |

The results of Table 7 to Table 11 indicate that, when attachment (60) is secured to the face of a range of different mobile phones (opposite to the side of the phone comprising the display), the signal strength, as indicated by measured TRP and TIS values, is not significantly reduced for all tested frequencies.

In one embodiment, the attachment (60) is configured to be substantially the same size and shape as the rear face of a mobile phone which assists users when affixing the attachment (60) to correctly and accurately physically locate the conducting element with respect to the antenna of the mobile phone.

In summary, the present invention provides an attachment that, when affixed to an electronic communications device, reduces electromagnetic radiation levels directed toward a user whilst not substantially decreasing the signal strength of the device. Coating the conducting element with materials that exhibit dielectric properties, allows the attachment to function over a wide range of frequencies and reduces the electromagnetic radiation directed toward a user. Further, in an embodiment, forming a conducting element from flexible printed circuit board with copper conducting sub-elements of approximate thickness of 0.1 mm and layered coatings applied by micronic spraying and attaching the coated conducting element to a non-conducting substrate with an approximate thickness of 0.2 mm, the overall thickness of the resulting attachment is approximately 0.3 mm. Manufacturing an attachment in this manner allows a user to secure the attachment to a face of their electronic communications device and attach any protective casing preferred by the user without the attachment interfering with the fitment of the protective casing.

The above description is not intended to be exhaustive or to limit the invention to a single disclosed embodiment. As mentioned above, numerous alternatives and variations to the present invention will be apparent to those skilled in the relevant field of technology. Accordingly, while some alternative embodiments have been discussed specifically, other embodiments will be apparent or relatively easily developed, by those of requisite skill. Accordingly, this patent specification is intended to embrace all alternatives, modifications and variations of the present invention that have been discussed herein, and other embodiments that fall within the spirit and scope of the above described invention.

The reference to any prior art in this specification is not, and should not be taken as, an acknowledgement or any suggestion that the prior art forms part of the common general knowledge in Australia.

What is claimed is:

1. An attachment for an electronic communications device including a conducting element that is coated on one side with layers of dielectric material and securely affixed to a non-conducting substrate such that the overall dimensions and thickness of the attachment are sufficiently small to allow the attachment to be attached to an outer surface of an electronic communications device whilst not interfering with the use of any protective casing preferred by the user.

2. An attachment according to claim 1 wherein the non-conducting substrate comprises PTFE (polytetrafluoroethylene) that is about 0.2 mm in thickness.

3. An attachment according to claim 1 wherein the conducting element comprises conductive material that is copper having a thickness of about 0.1 mm.

4. An attachment according to claim 1 wherein the conducting element includes various shaped segments of conducting material and includes V-shaped segments, chevron-shaped segments, linear segments, rectangular and/or triangular segments or any segments or combinations thereof.

5. An attachment according to claim 1 wherein the layers of material that coat the conducting element comprise dielectric materials that are mixed and sprayed in layers onto the conducting element.

6. An attachment according to claim 1 wherein the conducting element is coated on both sides with layers of dielectric materials.

7. An attachment according to claim 1 wherein the dielectric material includes any one or more of $Al_2O_3$, $SiO_2$, $Ag_2O$, $B_2O_3$, $MgO$, $Fe_2O_3$, $Na_2O$, $K_2O$, $CaO$, $P_2O_5$, $Au$, $TiO_2$ and/or $FeO$.

8. An attachment according to claim 5 wherein the conducting element, once coated with dielectric materials, is subsequently coated with UV acrylic material.

9. A method of manufacturing an attachment for an electronic communications device including:
   forming a conducting element;
   coating the conducting element with one or more layers of dielectric materials such that the overall dimensions and thickness of the attachment are sufficiently small to allow the attachment to be attached to an outer surface of an electronic communications device whilst not interfering with the use of any protective casing preferred by a user;
   allowing the one or more layers to dry, and
   securely attaching the coated conducting element to a non-conducting substrate.

10. An attachment manufactured in accordance with the method of claim 9.

* * * * *